June 26, 1928.  H. M. PFLAGER  1,674,795
LOCOMOTIVE CRADLE
Filed April 26, 1926
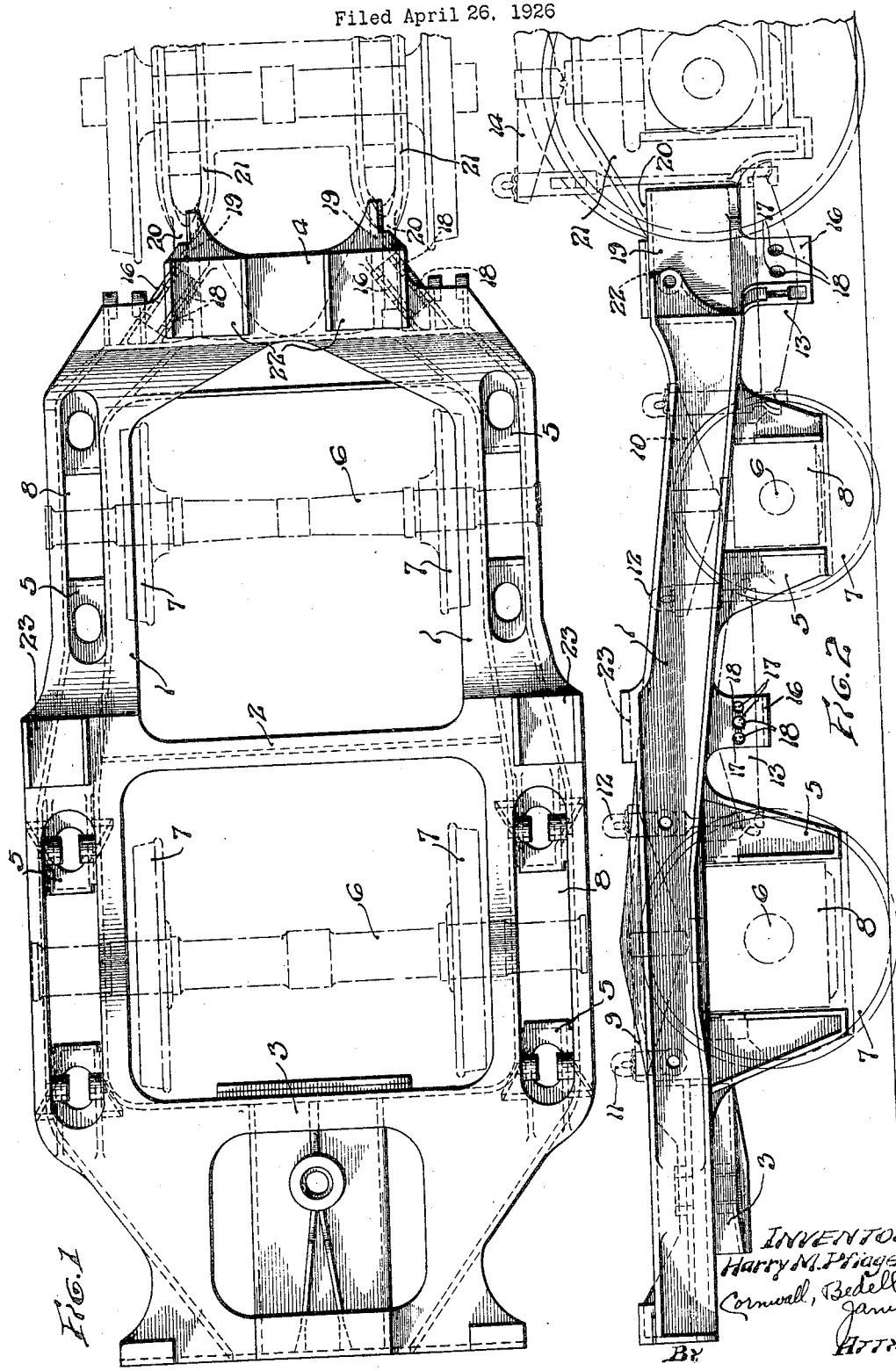

Patented June 26, 1928.

1,674,795

UNITED STATES PATENT OFFICE.

HARRY M. PFLAGER, OF ST. LOUIS, MISSOURI, ASSIGNOR TO COMMONWEALTH STEEL COMPANY, OF GRANITE CITY, ILLINOIS, A CORPORATION OF NEW JERSEY.

LOCOMOTIVE CRADLE.

Application filed April 26, 1926. Serial No. 104,635.

My invention relates to a new and useful improvement in locomotives and more particularly to the cradle portion thereof which comprises the rearward section extending away from the driving wheels. In a type of locomotive now being produced it is desirable to provide trailing axles under the cradle portion to aid in carrying the weight of various parts which are a substantial distance to the rear of the driving wheels. In the past it has been customary to utilize either a trailing truck as a separate unit or a single trailing axle to support this load. If the trailing axle were used there was but a single axle regardless of the weight or the distance of this weight from the support given it by the driving wheels.

My invention contemplates and one of its principal objects is to provide a combined cradle and truck frame having two or more trailing axles.

Another object is to provide equalizing members between the trailing wheels and between the trailing wheels and the driving wheels.

A further object is to provide the cradle portion with integrally formed boiler supports and fire box supports.

A still further object is to provide an adjustable fulcrum for the equalizer bars.

With the foregoing and other objects in view, my invention consists in certain novel features of construction and arrangement of parts, hereinafter more fully described and claimed, and illustrated in the accompanying drawings, in which—

Figure 1 is a top plan view of a locomotive cradle embodying my invention.

Figure 2 is a side elevation of the cradle.

As illustrated in the drawings, the entire cradle portion of the locomotive frame is cast in a single piece and may either be formed with the main frame of the locomotive or rigidly bolted thereto as the individual requirement demands.

The numeral 1 indicates the side frames of the cradle, preferably box-shaped in cross section, which are joined together intermediate their ends by an I-beam cross tie 2. Side frames 1 terminate at their rearward ends in foot plate 3 which serves as a transverse member. At their forward ends the side frames merge into alignment with the main frame of the locomotive and are joined by cross member 4. This unitary cradle construction has its side frames spaced sufficiently apart to accommodate the wheels of the trailing axles.

On each of the side members 1 are two or more pedestals 5, preferably formed integrally, but they may be bolted on. Axles 6 having wheels 7 mounted thereon are mounted in pedestals 5 through the medium of the ordinary journal boxes 8. Springs 9 and 10 located over each of the pedestals 5 and within the limits of side frame 1 transfer the load to the journal boxes 8.

The rearward ends of springs 9 are connected to the side frames by spring hangers 11. The forward ends of these springs and both ends of springs 10 are connected to the side frames by spring hangers 12 fastened to the ends of equalizer bars 13 which are in turn connected to the side frames 1. The forward equalizer bars project under the end of the rear driving wheel springs 14 and are connected thereto by the usual spring hangers.

Equalizer bars 13 are supported and fulcrumed intermediate their ends by lugs 16 which are formed integrally with and depend from the locomotive cradle. Each of the lugs 16 is provided with a plurality of openings 17 adapted to receive the pin on which the equalizer bars are fulcrumed. The equalizer bars are provided with a plurality of horizontally disposed openings 18 corresponding to the openings 17.

By selection of the desired corresponding openings 17 and 18 into which the equalizer bar carrying pin is inserted, the fulcrum may be varied and the proper proportion of the load distributed to each of the wheels. This manner of connection between the springs and the arrangement of the equalizers provide proportionate equalization of the load between all of the driving wheels and the trailing wheels.

Projecting forwardly from cross member 4 are two vertically disposed plates 19 so spaced as to meet corresponding rearwardly projecting plates 20 of the locomotive main frame 21. Plates 19 and 20 are adapted to be rigidly bolted or riveted together to form a solid connection. Rear boiler supporting members 22 are integrally formed on the upper surface of cross member 4 and fire box supporting pads 23 are formed integrally with each of side frames 1 on their upper surfaces approximately intermediate their ends.

It is to be understood that minor changes in the size, form and construction of the various parts of my device may be made and substituted for those herein shown and described, without departing from the spirit of my invention as set forth in the appended claims.

I claim:

1. A one piece locomotive cradle having connected side members that are spaced a sufficient distance apart to accommodate between them the wheels of the trailer axles associated with the cradle, longitudinally spaced pedestals, and equalizer fulcrums integral with the cradle and positioned between said pedestals.

2. A one piece locomotive cradle having connected side members that are spaced a sufficient distance apart to accommodate between them the trailer wheels, and a plurality of pairs of pedestals integral with the cradle to accommodate the journal boxes with their contained parts.

3. A one piece combined locomotive cradle and truck frame having in combination box-shaped side members that are spaced a sufficient distance apart to accommodate between them the wheels of a plurality of trailer axles, integral adjustable fulcrum brackets, integral cross members connecting the side members, and integral locomotive firebox and boiler supports.

4. A combined locomotive cradle and truck frame having wheel enclosing side pieces, spaced pedestals on each side piece, and integrally formed adjustable equalizer bar fulcrums between said pedestals.

5. As a new article of manufacture, a combined locomotive cradle and trailer truck frame having longitudinally spaced pedestals formed integrally therewith for the accommodation of a plurality of trailing axles.

6. In combination with a locomotive frame, driving wheels therefor, and a cradle forming a rigid extension of said frame and having a plurality of pedestals on each of the side frames thereof, journal boxes mounted in said pedestals, wheel carrying axles mounted in said journal boxes, and equalizers mounted on each of said side frames between said pedestals to equalize the loads of said axles.

7. In a locomotive having a main frame carried by driving axles, a combined cradle and truck frame carried by a plurality of trailing axles, equalizers mounted between said trailing axles, and means for proportionately equalizing the respective loads of the driving axles and the trailing axles.

8. In a locomotive having a main frame carried by driving axles, a combined cradle and truck frame carried by a plurality of trailing axles, equalizers mounted between said trailing axles, and equalizers fulcrumed on the forward end of said combined cradle and truck frame to proportionately equalize the loads of all of the said axles.

9. In a combined cradle and truck frame, a pair of spaced side pieces, pedestals on said side pieces, trailing axles having spring supports mounted in said pedestals, integrally formed equalizer fulcrums on said side pieces between said pedestals, said fulcrums being adapted to support equalizers for the trailing axles, and equalizing fulcrums formed forward of the foremost of said pedestals adapted to support a member to interconnect the main spring system of the locomotive and the spring system of the trailing axles.

10. In a locomotive, a main frame, a cradle rigid therewith, a plurality of trailer axles and boxes assembled with said cradle, a driving axle and box assembled with said main frame, and means mounted on said cradle to equalize the respective loads on said axles.

11. In a locomotive, a main frame, a cradle rigid therewith, a plurality of trailer axles and boxes assembled with said cradle, an equalizer fulcrumed on said cradle between said trailer axles, an equalizer fulcrumed on said cradle at the forward end of the latter, and springs supporting said equalizers from all of said axles.

12. In a combined locomotive cradle and trailer truck frame, longitudinally spaced pedestals, integrally formed boiler supports in front of and at the rear of said pedestals, and an integrally formed fire box support between said pedestals.

13. A combined locomotive cradle and trailer truck frame having integrally formed longitudinally spaced pedestals and fire box supporting members between said pedestals.

14. In a combined locomotive cradle and truck frame, fire box supports, equalizer bar supports beneath said fire box supports, and pedestals on both sides of said supports.

15. In a combined locomotive main frame, cradle and truck frame, longitudinally spaced pedestals under the cradle portion and integrally formed depending lugs between said pedestals adapted to support and adjustably fulcrum equalizer bars.

16. In a combined locomotive main frame, cradle and truck frame, longitudinally spaced pedestals under the cradle portion and integrally formed depending lugs between said pedestals adapted to support and fulcrum equalizer bars.

In testimony whereof I hereunto affix my signature this 23rd day of April, 1926.

H. M. PFLAGER.